United States Patent [19]

Clark et al.

[11] 4,057,612
[45] Nov. 8, 1977

[54] METHODS OF MAKING A DOLL HAVING FUNCTIONAL INSERTS

[75] Inventors: William Frederick Clark; Richard Joseph Maddocks, both of London, England

[73] Assignee: Lesney Products & Co. Limited, London, England

[21] Appl. No.: 680,515

[22] Filed: Apr. 26, 1976

[30] Foreign Application Priority Data

Apr. 30, 1975 Australia .............................. 18087/75

[51] Int. Cl.² .......................... B29C 5/04; B29C 5/12; B29D 3/00
[52] U.S. Cl. .................................... 264/275; 264/279; 264/310; 264/DIG. 60
[58] Field of Search ............... 264/275, 277, 310, 311, 264/259, 279, DIG. 60; 46/163, 173

[56] References Cited

U.S. PATENT DOCUMENTS

| | | | |
|---|---|---|---|
| 1,304,201 | 5/1919 | Ralston et al. .......................... | 46/163 |
| 2,720,003 | 10/1955 | Harris et al. .......................... | 264/277 |
| 3,071,893 | 1/1963 | Schwartz ................................ | 46/163 |
| 3,153,881 | 10/1964 | Baulard-Cogan ...................... | 46/163 |
| 3,284,947 | 11/1966 | Dahl ....................................... | 46/173 |
| 3,325,939 | 6/1967 | Ryan et al. ............................. | 46/173 |
| 3,456,046 | 7/1969 | Rosen .................................... | 264/310 |
| 3,830,898 | 8/1974 | Johnson et al. ....................... | 264/310 |
| 3,965,234 | 6/1976 | Lane ...................................... | 264/275 |

Primary Examiner—Willard E. Hoag

[57] ABSTRACT

A method of producing an article which incorporates an insert intended to perform a function in the finished article in which method the insert is placed in a rotation mold and material is molded around said insert to envelope the insert in the material. The method is particularly, but not exclusively, concerned with the production of prehensile hands for dolls and other primate figures in which an insert that includes a spring is enveloped in a synthetic plastics material, such as polyvinyl chloride, by a rotation molding process to produce a hand which will tend to grip an item placed between at least one finger and the thumb thereof.

10 Claims, 1 Drawing Figure

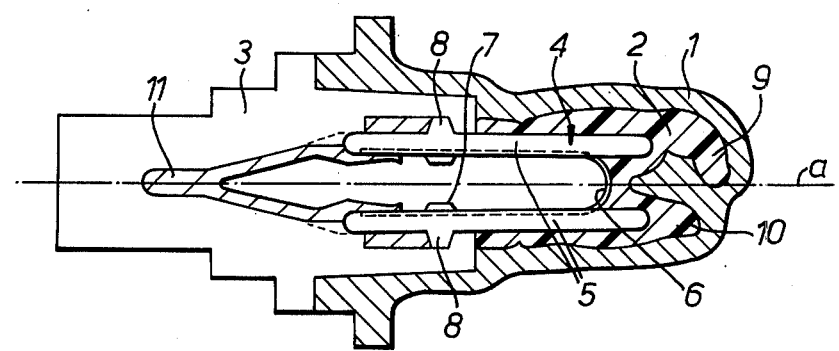

METHODS OF MAKING A DOLL HAVING FUNCTIONAL INSERTS

This invention relates to method of enveloping functional inserts and particularly to the making of dolls and like figures.

Rotation moulding of plastics materials is well known as a process for the production of at least parts of dolls and like figures such as animals and cartoon characters. This process involves rotating a mould at a low speed which is such that no significant centrifugal forces are generated but that is sufficient to counteract the effect which gravity would otherwise have upon the plastics material hardening, setting or curing within the mould. The present invention envisages the use of the known rotation moulding process in a method of embedding functional inserts and relates particularly to the provision of improved dolls and like figures.

According to the invention, there is provided a method of enveloping a functional insert by the employment of a rotation moulding process, wherein the method comprises the step of supporting an insert that is constructed to perform a function in the finished moulding in a rotation mould, and the step of enveloping said insert in the material that is rotation moulded by said process.

For a better understanding of the invention, and to show how the same may be carried into effect, reference will now be made, by way of example, to the accompanying drawing which is a diagrammatic section through a rotation mould constructed and arranged to form the grasping left hand of a doll by a method in accordance with the invention.

Referring to the drawing, a rotation mould 1 is provided that is shaped to form the grasping or gripping left hand 2 of a doll from a flexible synthetic plastics material which conveniently, but not essentially, is polyvinyl chloride. In accordance with known rotation moulding procedures, the mould 1 is arranged so that it can be revolved around an axis $a$ at a slow speed which is such that no significant centrifugal forces are generated but that is sufficient to counteract the effect which gravity would otherwise have upon the semi-liquid polyvinyl chloride or other synthetic plastics material from which the hand 2 is principally formed within the mould. The mould 1 is simultaneouly rocked about a second axis that extends substantially perpendicular to the axis $a$ to ensure that the synthetic plastics material is correctly distributed in the mould. The mould 1 is provided with a separate enclosure 3, which may nevertheless be considered as being part of the mould.

In accordance with the invention, an insert that is generally indicated by the reference 4 is provided, said insert 4 being constructed to effect a mechanical movement in the finished moulding which mechanical movement, in this particular case, is the opening of the prehensile hand 2 prior to grasping or gripping a small object, or to allow such a small object to be released. The insert 4 comprises two strips 5 and a generally U-form spring 6 whose limbs are fastened to the two surfaces of the strips 5 that face one another. The two strips 5 are preferably formed from a synthetic plastics material which may conveniently, but not essentially, be the polyamide material that is commercially available under the name "Maranyl" since it has been found that this material will withstand the temperature of 300° C or more that may be required for the curing of the semi-liquid polyvinyl chloride paste from which the hand 2 is principally formed without being significantly degraded both during that initial curing in an oven and during subsequent cooling and setting of the polyvinyl chloride. The spring 6, which may be a spring steel strip, reliably interconnects the two strips 5 by forming it with holes through which swaging bosses 7 that are integral with the two strips 5 are entered. Small metallic rivets could, however, equally well be employed for this purpose.

The sides of the two strips 5 that are remote from one another are formed with further locating bosses 8 that are in substantial register with the swaging bosses 7 and, at the commencement of the formation of the left hand 2 by a method in accordance with the invention, the two strips 5 are compressed together, against the action of the spring 6, and are entered into the mouth of the mould enclosure 3 until the locating bosses 8 will engage behind lips (shoulder) of that mouth. It will be noted from the drawing that the hand 2 is formed with its fingers 9 and thumb 10 in a "half open" position and it will be realised that this is necessary because a portion of the material of the rotation mould 1 itself must occupy a position in which it can define the facing surfaces of the separated fingers 9 and thumb 10 and at least part of a palm region of the hand 2. Once the insert 4 is correctly supported by the mould enclosure 3, that enclosure is connected to the mould 1 itself in a conventional way by co-operation of the tapering male and female surfaces that can be seen in the drawing whereafter the semi-liquid polyvinyl chloride paste or other material of the greater part of the hand 2 is supplied into the internal cavity of the combined mould 1 and enclosure 3 in a conventional manner and slow rotation about the axis $a$ commences, together with the concurrent rocking motion mentioned above, the mould being subjected, in an oven, to the temperature required to cure the polyvinyl chloride. The polyvinyl chloride subsequently cools and sets with the insert 4 surroundingly enveloped thereby and keyed thereto. When the setting is completed, the mould enclosure 3 is parted from the rest of the mould 1 and the moulded hand 2 is removed from the enclosure 3 by applying a compressive force to the top and bottom thereof close to the lips of the mouth of the mould enclosure 3, as seen in the drawing, whereafter the finished hand 2 can be withdrawn from the enclosure 3 to the right, again as seen in the drawing.

It will be noted that the finished hand 2 comprises a land 11 that can be employed in securing the hand to the arm of a doll by, for example, sewing. Other attachment means could equally well be employed such as a flange moulded around the wrist end of the hand 2 or a flexible wire embedded in the wrist end of the hand 2 but having a portion that projects from the hand in the direction of the arm to which the hand is to be secured.

When the hand 2 is released from the mould 1/3, the spring 6 of the enveloped insert 4 will tend to open to bring the strips 5 into non-parallel relationship and the tip of one of the fingers 9 into contact with the tip of the thumb 10, it being noted from the drawing that portions of the two strips 5 project into the index finger of the hand and into the thumb 10 thereof to produce a reliable grip. A child or other user of the finished doll can readily release the grip merely be squeezing the wrist region of the hand which brings the adjacent ends of the two strips 5 and the limbs of the spring 6 together, simultaneously parting the tip of the index finger from the tip of the thumb 10. A small object such, for example, as a pencil, can then be inserted between the fingers 9 and thumb 10 and, as soon as the squeeze upon the wrist region of the hand 2 is withdrawn, the spring 6 will immediately cause the hand to grip or grasp that pencil or the like quite firmly and that grip or grasp will be maintained until the wrist region is squeezed again to release it. Thin and/or flat objects, such as sheets of paper, can be gripped between the tip of one of the fingers 9 and the tip of the thumb 10 which parts tend always to be kept in contact by the spring 6.

Since the moulded hands of dolls and like figures are symmetrically identical, the insert 4 can be formed in such a way as to be suitable for incorporation in either the illustrated left hand 2 or in a complementary right hand. In the accompanying drawing, the two strips 5 extend substantially parallel to one another but not parallel to the axis a. In fact, they are significantly inclined to the axis a in such a way that the ends of the two strips 5 which are at the right in the drawing co-operate with the thumb 10 and with the opposed index finger of the hand 2. In the formation of a complementary right hand, the same insert 4 would co-operate with the thumb and index finger of that right hand but would have its strips 5 oppositely inclined to the axis a as compared with the illustrated construction. The insert 4 has been described and illustrated only as one possible example of an insert that is constructed to effect a mechanical movement in a finished rotation moulding.

In an alternative and preferred construction, the U-form spring 6 is replaced by a wire torsion spring and a pivot bearing in the form of a tubular rivet is introduced between the two strip-like limbs of the insert 4 to maintain the geometrical relationship between finger 9 and thumb 10. Instead of using co-operating features on the functional insert 4 and the internal wall of the mould enclosure 3 to support the former during moulding (which means that some portions of the functional insert 4 will always project through to the external surface of the covering) it is possible to use separate spacing pieces to support the insert 4 away from the walls of the mould. If such spacing pieces are made of a material that is identical to, or compatible with, the mouldable synthetic plastics material, and preferably of a matching colour, then the latter would fuse with the spacing pieces during the moulding process to give a relatively homogeneous covering that would totally enclose the functional insert 4 and locate it without any visible means of support.

It is a feature of the rotation moulding process that, if total enclosure is not required, the outer skin may be removed, where required, to give selective access to the functional insert 4, or to the interior of that skin. It is within the scope of the invention to produce rotationally moulded dolls and like figures or parts thereof in which embedded, and normally completely concealed, inserts will change the attitudes of limbs, open or close jaws, alter facial expressions and perform other similar functions.

Although this invention has so far been presented solely in relation to methods of making at least parts of dolls or like figures from flexible plastics materials, the invention is applicable to the enveloping of a functional insert in a rotationally moulded skin for many commercial, industrial and medical purposes. A relatively impenetrable substantially rigid, semi-rigid or flexible envelope for a functional insert may be provided when that insert requires some measure of protection against mechanical, electrical, acoustic, thermal and/or chemical hazards. Alternatively, such an envelope can usefully be employed to maintain a functional insert in an enclosed environment such as a partial vacuum, an inert gas or a lubricant or the like, the environment being created inside, or introduced into, the rotationally moulded envelope or skin to maintain, benefit and/or preserve the functional insert and the manner in which it operates. The invention thus provides a single basic and relatively inexpensive method of providing an outer protective covering for a functional insert which would otherwise require the use of more complicated and expensive covering materials and/or components to maintain and protect its operation. The retention of a supply of lubricant for the operation of a functional insert is a prime example of the way in which a method in accordance with the invention may be employed and, in the medical field, the skin or envelope in which the functional insert is keyed may be tinted and textured to simulate living skin for the purposes of prosthetic surgery and the like.

Any rotationally mouldable material, such as rubber latex, polyvinyl chloride or the like, may be employed to embed or envelop a functional insert formed from any required material or materials provided only that none of the by-products or consequences of a change in phase or physical condition from a liquid or semi-liquid to a solid on the part of the enveloping material will adversely affect the durability or operation of the functional insert. Bearing this in mind, it is quite possible to employ a number of hot-curing and cold-curing enveloping materials in the rotation moulding process to produce hollow components in which the functional inserts are located, such materials not necessarily having thermoplastic properties nor necessarily being flexible when set or cured. As an example, a functional insert in the form of an electric switch that consists of a number of moving parts could be directly encapsulated in a hollow shell consisting of an epoxy resin or a polyester resin, either of which may be hot or cold cured. As a further possibility, a metallic alloy whose melting point is sufficiently low as not to affect the construction or operation of the electric switch could be used as the encapsulating material.

It is noted that more than one form of rotation moulding process is known and is usable in a method in accordance with the invention. For example, one such process involves the simultaneous slow rotation of a mould equivalent to the mould 1/3, or a bank of such moulds, around two or more separate axes at least one of which does not pass through the mould or moulds.

We claim:

1. In a method for making a doll in a rotational mold, the doll having at least one spring biased insert member extending into at least two digits of one hand by actuation of which member the doll hand can be caused to grasp and hold on object, the steps comprising: inserting each said insert member into a hand portion of said mold, said hand portion of said mold being separated from a insert portion of said mold by a projecting shoulder, said insert member having two spaced extending members adapted to be inserted into digit portions of said mold each said extending member having a boss projecting therefrom, said inserting including introducing said extending members into digit portions of said mold until each said boss engages one said shoulder and introducing hardenable molding material into said mold and about portions of said insert.

2. A method according to claim 1, wherein the insert is arranged to tend to maintain at least one finger and the thumb of said hand in contacting relationship in the finished molding.

3. A method according to claim 1, wherein the insert is significantlfy inclined, in the rotational mold, to at least one axis about which that mold is rotatable during said process.

4. The method of claim 1, wherein each hand portion of said mold is separable from a main portion of said mold and inserting each said insert into each said hand portion and thereafter attaching each said hand portion of said mold to said main portion of said mold.

5. A method according to claim 1 including the step of using separate spacing pieces to support the insert in the rotation mold in such a way that the insert does not contact the walls of the mold, the separate spacing pieces being formed from a material that is substantially identical to the enveloping material.

6. A method according to claim 1 wherein the enveloping material is polyvinyl chloride, said insert being constructed for effecting mechanical movement in the finished molding, said insert comprising two strips and a spring, said spring being arranged for maintaining said strips in a predetermined position relative to one another, said strips being formed of polyamide material, the rotation molding process comprising the step of ovencuring said polyvinyl chloride, using separate pieces to support said insert in the rotation mold so that said insert does not contact the walls of the mold, said separate spacing pieces being formed from material substantially identical to the enveloping material, the rotation mold being constructed to produce the hand of a primate figure in the form of a doll, said insert being arranged for maintaining at least one finger and the thumb of said hand in contacting relationship in the finished molding, said insert being significantly inclined in the rotation mold to at least one axis about which said mold is rotatable during said process, said hollow flexible shell being collapsible for transferring deflection from said shell to said insert and from thence to the digits of said hand.

7. A method according to claim 1, wherein the molding material is polyvinyl chloride.

8. A method according to claim 7, wherein the rotation molding process comprises the step of ovencuring the polyvinyl chloride.

9. A method according to claim 1, wherein the insert comprises two strips and a spring, the spring being arranged to tend to maintain said strips in a predetermined positional relationship relative to one another.

10. A method according to claim 9, wherein the strips are formed from polyamide material.

* * * * *